3,793,385
HYDROCARBON SEPARATION PROCESS
Adrian Edward Bond, Camberley, Christopher George Venning Burgess, Weybridge, and David Eric Martin, Camberley, England, assignors to BP Chemicals International Limited, London, England
No Drawing. Filed Apr. 18, 1972, Ser. No. 245,184
Claims priority, application Great Britain, Apr. 20, 1971, 10,048/71
Int. Cl. C07c 7/12, 15/08
U.S. Cl. 260—674 SA                    17 Claims

ABSTRACT OF THE DISCLOSURE

Zeolite beta is used to separate $C_8$ alkyl benzenes. In an example from a blend of 47.8% m-xylene, 22.0% p-xylene, 19.4% ethylbenzene and 7.6% o-xylene a desorbate containing 98% p-xylene and ethylbenzene was obtained in a yield of 3.1% sieve wt.

---

This invention relates to a process for the separation of aromatic isomers; more particularly to the separation of xylene isomers.

The use of zeolitic molecular sieves for the separation of $C_8$ aromatic isomers has been previously proposed in U.K. Pat. No. 828,777.

It has now been found that zeolite having the X-ray diffraction pattern shown in Table 1 can be used for the separation of $C_8$ aromatic isomers.

Thus, according to the present invention a process for the separation of at least one $C_8$ aromatic isomer from a feed containing a mixture of $C_8$ aromatic isomers comprises:

(a) contacting the feed with a bed of zeolitic aluminosilicate adsorbent having the X-ray diffraction pattern shown in Table 1 or Table 6
(b) adsorbing the more selectively adsorbable $C_8$ aromatic isomer of the feed, withdrawing from the bed of adsorbent a raffinate stream comprising less selectively adsorbed $C_8$ aromatic isomers and
(c) desorbing the selectively adsorbed $C_8$ isomer from the adsorbent.

The process can be operated in either the liquid or vapor phases, but the latter is preferred.

The process is suitable for cyclic operation.

Preferably the temperature is as low as possible consistent with the operation being the vapor phase.

Optionally a diluent gas such as nitrogen or hydrogen is used in the adsorption stage.

The desorption can be effected by displacement with a desorbing agent or by pressure reduction, although the former is preferred.

Suitable desorbing agents include hydrocarbons such as mononuclear aromatic hydrocarbons and alkanes such as n-pentane. A particularly suitable desorbing agent is toluene.

Preferably a purge stage is interposed between the adsorption and desorption stages to remove interstitial and surface adsorbed material.

Nitrogen and hydrogen are particularly suitable purging agents.

Alternatively purging can be effected by pressure reduction.

Operating conditions can be as follows:

Adsorption stage:
space velocity from 0.3 to 6.0 LHSV preferably from 0.3 to 4.0 LHSV duration preferably from 0.5 to 10 mins. pressure preferably from 10 to 100 p.s.i.a.
Purge:
space velocity from 100 to 500 GHSV preferably from 100 to 300 GHSV duration preferably from 0.5 to 10 min. pressure preferably from 10 to 100 p.s.i.a.
Desorption stage:
space velocity from 0.5 to 8.0 LHSV preferably from 0.5 to 6.0 LHSV duration preferably from 0.5 to 20 mins. pressure preferably from 10 to 100 p.s.i.a.

The process is preferably operated isothermally at temperatures within the range from 120 to 300° C.

The zeolite having the X-ray diffraction pattern shown in Table 1 or Table 6 can be prepared as described in U.S. Pat. 3,308,069 which describes the preparation of a material referred to as zeolite beta. In the course of the preparation tetraethylammonium ions are used and it has been found that the zeolite as prepared (containing tetraethylammonium ions) will not adsorb $C_8$ alkyl aromatics and that it is necessary to calcine the zeolite to remove these ions. The calcining is preferably effected by heating the zeolite in air above about 300° C. for sufficient time to remove the tetraethylammonium ions.

The zeolite can be used immediately after calcining in air without any further treatment or the zeolite can be subjected to ion exchange after calcining but before use. Preferred ions for the exchange include: $Li^+$, $K^+$, $Cs^+$, $Mg^{++}$, $Ca^{++}$, $Sr^{++}$, $Ba^{++}$, $La^{3+}$, and $Ce^{3+}$ especially $Cs^+$ and $K^+$. Preferably the amount of ions exchanged onto the sieve is as much as can be got on to the sieve.

In one embodiment of the present invention a process for the separation of a mixture of p-xylene and ethylbenzene from a mixture comprising m-xylene, p-xylene and ethylbenzene comprises:

(a) contacting the mixture with a bed of zeolitic aluminosilicate absorbent having the X-ray diffraction pattern shown in Table 1 or 6 to adsorb selectively the p-xylene and ethylbenzene and withdrawing from the bed a raffinate stream enriched in m-xylene
(b) contacting the bed with a purging medium in a purge stage to remove interstitial and surface adsorbed material
(c) desorbing the p-xylene and ethylbenzene from the adsorbent.

The mixture of p-xylene and ethylbenzene obtained is preferably subjected to fractional distillation and the bottoms fraction containing p-xylene subjected to fractional crystallization to yield p-xylene.

It has been found that as desorption proceeds, the proportion of p-xylene and ethylbenzene in the desorbate increases. It is therefore advantageous, when a high purity mixture of ethylbenzene and p-xylene is required, to collect the initial desorption effluent as a purge effluent e.g. a toluene purge can be employed. Preferably the effluent withdrawn from the purge stage is recycled to the adsorption stage.

The feed to the adsorption stage can be a $C_8$ aromatic heart cut from a catalytic reformer.

The raffinate withdrawn from the adsorption stage can be subjected to isomerization and the isomerized mixture recycled to the adsorption stage.

The invention is illustrated by the following examples:

EXAMPLE 1

In all the examples the desorption effluent was subjected to fractional distillation to separate the ethyl benzene and p-xylene from the desorbent.

The zeolite was prepared in the following manner:

2.9 g. of commercial sodium aluminate obtained from Hopkins and Williams Limited was added to 44.0 g. of 25% w./w. aqueous solution of tetraethylammonium hydroxide at room temperature. On adding 54.5 g. of silica sol (Ludox HS) dropwise and 3 g. of water to the solution a smooth gel was obtained. This was heated in an autoclave at 150° C. and an average pressure of 80 p.s.i.g. for 6 days. The solid zeolite product was separated by filtration and its X-ray powder diffraction pattern determined, which is set out in Table 1 below. The zeolite thus prepared had a purity of about 75% as determined by X-ray powder diffraction, the remainder being amorphous material. The zeolite was calcined in air at 550° C. for 18 hours, and its selectivity for $C_8$ alkyl aromatics determined as follows:

A feed mixture consisting of an equivolume blend of ethylbenzene, p-xylene and m-xylene was contacted, under the conditions given in Table 2, with a bed of 7.6 g. of zeolite β which had been previously calcined in air at 550° C. The total amount of $C_8$ aromatics desorbed comprised 38.2 percent ethylbenzene, 43.0 percent p-xylene and 18.8 percent m-xylene, the yield being 10.9 percent sieve weight. The change in composition of successive fractions of the absorb stream is shown in Table 3.

The product yields for various purities are recorded in Table 4 and it is noted that a p-xylene+ethylbenzene purity of 97.1 percent can be achieved at a cyclic yield of 1.5 percent sieve weight.

TABLE 1.—X-RAY DIFFRACTION DATA ZEOLITE BETA

| Relative intensity | Interplanar spacing d(A) |
|---|---|
| 100 | 11.32 |
| 3 | 5.34 |
| 15 | 4.12 |
| 50 | 3.94 |
| 3 | 3.50 |
| 6 | 3.31 |
| 3 | 3.08 |
| 6 | 3.02 |
| 3 | 2.67 |
| 1 | 2.59 |

TABLE 2.—XYLENE SEPARATION BY ZEOLITE BETA
Operating conditions

| | | |
|---|---|---|
| Temperature through | °C | 180 |
| Reactor volume | cm.³ | 30 |
| Pressure | | Ambient |
| Absorption stage: | | |
| Feed rate | LHSV | 0.66 |
| Nitrogen diluent rate | GHSV | 100 |
| Duration | min | 10 |
| Purge stage: | | |
| Nitrogen flow rate | GHSV | 200 |
| Duration | min | 10 |
| Desorption stage: | | |
| Toluene at flow rate | LHSV | 1.33 |
| Duration | min | 12 |

TABLE 3.—DESORBATE COMPOSITION AS A FUNCTION OF $C_8$ AROMATICS DESORBED: SIEVE WT.=7.6 G.

| Desorbate composition [1] | | | Desorbate composition [2] | | | Weight of $C_8$ aromatics desorbed (gms.) |
|---|---|---|---|---|---|---|
| Percent wt. ethylbenzene | Percent wt. p-xylene | Percent wt. m-xylene | Percent wt. ethylbenzene | Percent wt. p-xylene | Percent wt. m-xylene | |
| 21.8 | 24.2 | 18.5 | 33.9 | 37.5 | 28.6 | 0.253 |
| 15.2 | 17.2 | 9.9 | 35.9 | 40.7 | 23.4 | 0.126 |
| 12.1 | 13.6 | 6.3 | 37.9 | 42.5 | 19.6 | 0.097 |
| 9.2 | 10.6 | 3.9 | 38.8 | 44.7 | 16.5 | 0.081 |
| 6.9 | 7.8 | 2.2 | 40.9 | 46.2 | 12.9 | 0.096 |
| 4.7 | 5.4 | 1.0 | 42.7 | 48.3 | 8.9 | 0.063 |
| 3.4 | 3.8 | 0.5 | 43.8 | 50.2 | 6.0 | 0.051 |
| 2.1 | 2.5 | Trace | 45.0 | 54.0 | 1.0 | 0.037 |
| 1.4 | 1.4 | | 50.0 | 50.0 | | 0.024 |

[1] Toluene to 100 percent.
[2] Toluene free composition.

TABLE 4.—ZEOLITE BETA DESORBATE COMPOSITION AS A FUNCTION OF PRODUCT YIELD

| Yield, percent sieve wt. | Desorbate composition [1] | | |
|---|---|---|---|
| | Percent eb | Percent px | Percent mx |
| 10.9 | 38.2 | 43.0 | 18.8 |
| 7.6 | 40.1 | 45.4 | 14.5 |
| 6.0 | 41.3 | 46.7 | 12.0 |
| 4.7 | 42.2 | 47.9 | 9.9 |
| 3.6 | 43.3 | 48.8 | 7.9 |
| 2.4 | 44.6 | 50.2 | 5.2 |
| 1.5 | 45.9 | 51.2 | 2.9 |

[1] Toluene free composition.

EXAMPLE 2

40 gms. of molecular sieve prepared as described in Example 1 were calcined in air for 18 hours at 580° C. 10 gms. of the calcined sieve were placed in a 250 ml. round bottom flask and then treated with an aqueous solution of caesium chloride containing 10 gms. of CsCl in 100 mls. water. The solution was heated to 100° C. and refluxed for 48 hours. The solution was then filtered. The sieve was recovered from the filter paper and the operation repeated except the refluxing was for 24 hours. The solution was filtered and washed with distilled water until no trace of chloride ions appeared in the washing. The zeolite was dried and calcined at 560° C. for 18 hours.

A feed mixture consisting of an equivolume blend of ethylbenzene, p-xylene and m-xylene was contacted, under the conditions given in Table 2 with a bed of 5.4 g. of the sieve. 8.6 percent sieve weight of $C_8$ aromatics were desorbed which comprised 51.1 percent ethylbenzene, 39.9 percent p-xylene and 9.0 percent m-xylene. The purity of ethylbenzene+p-xylene increased with increasing desorption duration. The product yields for various purities which are given in Table 5.

TABLE 5.—CESIUM EXCHANGED ZEOLITE BETA (EXCHANGED AFTER CALCINATION) DESORBATE COMPOSITION AS A FUNCTION OF PRODUCT YIELD

| Yield, percent sieve wt. | Desorbate composition [1] | | | |
|---|---|---|---|---|
| | Percent eb+px | Percent eb | Percent px | Percent mx |
| 8.6 | 91.0 | 51.1 | 39.9 | 9.0 |
| 4.3 | 96.9 | 57.9 | 39.0 | 3.1 |
| 2.8 | 98.2 | 61.0 | 37.2 | 1.8 |
| 1.9 | 98.7 | 63.2 | 35.5 | 1.3 |
| 1.3 | 99.3 | 65.4 | 33.9 | 0.7 |

[1] Toluene free composition.

EXAMPLE 3

This examples describes the use of a barium exchanged sieve.

10 g. of a batch of molecular sieve prepared as described in Example 1 were calcined in air for 18 hours at 580° C. This batch of zeolite had the X-ray powder diffraction pattern set out in Table 6 below. The sieve was exchanged to the barium form using the same weights and conditions as Example 2 except that barium chloride was used instead of caesium chloride.

A feed mixture consisting of an equivolume blend of ethylbenzene, p-xylene and m-xylene was contacted under the conditions given in Table 2 with a bed of 3.85 g. of the sieve. 9.9 percent sieve weight of $C_8$ aromatics were desorbed which comprised 50.0 percent ethylbenzene, 40.1 percent p-xylene and 9.9 percent m-xylene. The purity of ethylbenzene+p-xylene increased with increasing desorption duration, and the initial fraction desorption effluent were discarded as a purge effluent and the product streams of various purities were obtained. The product yields for these purities are given in Table 7 below.

EXAMPLE 4

This example describes the use of a potassium exchanged sieve.

10 g. of molecular sieve from the preparation described in Example 3 was exchanged to the potassium form using the same weights and conditions as Example 2 except that potassium chloride was used as exchanging agent. 2.0 g. of this sieve was contacted with an equivolume blend of ethylbenzene, p-xylene and m-xylene under the conditions given in Table 2. 11.6 percent sieve weight of $C_8$ aromatics were desorbed which comprised 51.2 percent ethylbenzene, 38.5 percent p-xylene and 10.3 percent m-xylene. The product yields for various purities are given in Table 8 below.

EXAMPLE 5

This example is included to demonstrate the use of a four component feedstock.

10 g. of molecular sieve from the preparation described in Example 3 were exchanged with caesium chloride in place of barium chloride using the same weights and conditions as Example 2.

A four component feedstock comprising 2.6 percent toluene, 18.3 percent ethylbenzene, 21.8 percent p-xylene, 49.2 percent m-xylene, 8.1 percent o-xylene, taken from the inlet of a commercial p-xylene crystallization unit was passed over 3.63 g. of the sieve using the conditions given in Table 2. 8.8 percent sieve weight of $C_8$ aromatics were desorbed which comprised 44.5 percent ethylbenzene, 38.6 percent p-xylene, 13.8 percent m-xylene and 3.1 percent o-xylene. The product yields for various purities are given in Table 9 below.

EXAMPLE 6

This example demonstrates continuous operation.
The zeolite was prepared in the following manner.
58 g. of commercial sodium aluminate was added to 880 g. of 25 percent w./w. aqeuous solution of tetraethylammonium hydroxide at room temperature. On adding 54.5 g. of silica solution (Ludox HS) dropwise and 60 g. of water to the solution a smooth gel was obtained. This was heated in an autoclave at 150° C. and an average pressure of 80 p.s.i.g. for six days. The solid zeolite product was separated by filtration. The zeolite thus prepared had a purity of about 75 percent as determined by X-ray powder diffraction, the remainder being amorphous material. The zeolite was calcined in air at 550° C. for 18 hours. 350 g. was placed in a 5 liter round bottom flask and then treated with an aqueous solution or caesium chloride containing 350 g. of CsCl in 3.5 liters of water. The suspension was heated to 100° C. and refluxed for 48 hours. The mixture was then filtered. The zeolite was recovered from the filter paper and the operation repeated except that the refluxing was for 24 hours. The solid zeolite product was filtered and washed with distilled water until no trace of chloride ions appeared in the washings. After drying, the X-ray powder diffraction pattern was determined which is set out in Table 6 below. The zeolite was ground to pass a 200 mesh BSS sieve, and 300 g. were mixed with 30 g. of clay binder. The mixture was extruded as 4 mm. pellets and was finally calcined in air at 560° C. for 18 hours.

230 g. of this zeolite were loaded into a pilot plant and contacted with a feed stream comprising 3.0 percent toluene, 18.5 percent ethylbenzene, 20.8 percent p-xylene, 46.7 percent m-xylene and 11.0 percent o-xylene. The feed was then replaced by toluene and the first portion of the effluent collected as a purge stage; the toluene flow was continued to desorb the product. This procedure was repeated to provide continuous operation. The conditions used and product yields and analyses obtained over 10 cycles are given in Table 10 below.

EXAMPLE 7

This example is included to demonstrate the effect of splitting the effluent from the adsorb stage into two parts and isomerizing the first part.

The same feed as used in Example 6 was passed over the same batch of zeolite. In this case, the adsorb stage was split into two stages. In commercial operation the effluent from the first part, which was low in p-xylene and ethylbenzene would be stripped of toluene by distillation and then isomerized using conventional technology before recycling to the adsorber. The adsorb stage was then continued until the zeolite was saturated with xylenes, the effluent being combined with that from the purge stage. The product analyses, yields and conditions are given in Table 11 below with other results in which the adsorb stage was not split.

EXAMPLE 8

This example is included to demonstrate the effect of recycle of various streams. It also describes the separation of the p-xylene and ethylbenzene.

The same batch of zeolite as used in Example 7 was contacted with a feed containing 2.7 percent toluene, 15.8 percent ethylbenzene, 23.7 percent p-xylene, 46.3 percent m-xylene and 11.5 percent o-xylene with the conditions shown in Table 12 below. The feed was obtained by recycling the purge effluent and the mother liquor from the fractional crystallizer. The results obtained are shown in Table 12 below. The desorption effluent, after stripping of toluene by distillation, was super-fractionated to remove a 99.7 percent pure ethylbenzene stream overhead. The superfractionator bottoms was fractionally crystallized at −7° C. to produce a p-xylene stream in 99.6 percent purity, the mother liquor being recycled to the adsorber. The feed to the superfractionater contained 67.5% p-xylene, 27.0% ethylbenzene, 5.1% m-xylene and 0.4% o-xylene and an overheads product containing 99.7% ethylbenzene and 0.3% p-xylene and a bottoms fraction containing 84.2% p-xylene 9.5% ethylbenzene 6.0% m-xylene and 0.3% ortho xylene and was passed to the fractional crystallizer from which a stream containing 99.2% p-xylene 0.5 ethylbenzene and 0.3% m-xylene and a mother liquor containing 58.0% p-xylene, 25.2% ethylbenzene 16.0% m-xylene and 0.8% o-xylene obtained.

EXAMPLE 9

This example is included to demonstrate the use of the potassium form in continuous operation.

A further batch of zeolite was prepared using the same weights and conditions as Example 6 above. The zeolite thus prepared was ion exchanged using the same weights and conditions as Example 6 except that potassium chloride was used instead of caesium chloride. The material was prepared in granular form without the use of binder by breaking up the cage formed on filtration. After calcination at 580° C., the X-ray powder diffraction pattern was determined which is set out in Table 6 below. 214 g. of this zeolite were loaded into the pilot plant and contacted with a feed comprising 2.3 percent toluene, 17.6 percent ethylbenzene, 22.6 percent p-xylene, 50.8 percent m-xylene and 6.7 percent o-xylene, using the conditions shown in Table 13 below. In this case it was unnecessary to split the adsorb stage into two parts. Product purities and yields at various flow rates are given in Table 13 below.

EXAMPLE 10

This example demonstrates the use of benzene as desorbent.

The batch of zeolite used in Example 9 was contacted with the same feedstock, but benzene was used as desorbent. Conditions used and yields and purities are given in Table 14 below.

TABLE 6
X-ray diffraction data for zeolite beta

| As prepared form (Example 3) | | Cs+ exchanged form (Example 8) | | K+ exchanged form (Example 4) | |
|---|---|---|---|---|---|
| Relative intensity | Interplanar spacing, d(A.) | Relative intensity | Interplanar spacing, d(A.) | Relative intensity | Interplanar spacing, d(A.) |
| 75 | 11.33 | 55 | 11.63 | 90 | 11.35 |
| 10 | 7.70 | 10 | 7.45 | 10 | 7.65 |
| 10 | 6.55 | 20 | 6.60 | 15 | 6.55 |
| 5 | 6.05 | | | 5 | 6.10 |
| 20 | 4.14 | 25 | 4.15 | 25 | 4.15 |
| 100 | 3.95 | 100 | 3.97 | 100 | 3.95 |
| 15 | 3.51 | 20 | 3.52 | 15 | 3.51 |
| 15 | 3.29 | 15 | 3.30 | 15 | 3.29 |
| 15 | 3.11 | 20 | 3.11 | 10 | 3.10 |
| 15 | 3.02 | 30 | 3.03 | 15 | 3.02 |
| 10 | 2.94 | 15 | 2.95 | 5 | 2.94 |

This table quotes Interplanar Spacing in A to conform with Table 1 (10A=1 nm.).

TABLE 7
Barium exchange (after calcination) zeolite beta, desorbate composition as a function of product yield

| Yield, percent sieve wt. | Desorbate composition [1] | | | |
|---|---|---|---|---|
| | Percent eb plus p | Percent eb | Percent px [1] | Percent mx |
| 4.5 | 97.8 | 56.6 | 41.2 | 2.2 |
| 3.1 | 99.2 | 57.5 | 41.7 | 0.8 |
| 2.0 | 100.0 | 57.5 | 42.5 | <0.1 |

[1] Toluene free compositions.

TABLE 8
Potassium exchanged (after calcination) zeolite beta, desorbate composition as a function of product yield

| Yield, percent sieve wt. | Desorbate composition [1] | | | |
|---|---|---|---|---|
| | Percent eb plus p | Percent eb | Percent px | Percent mx |
| 3.6 | 97.8 | 62.5 | 35.3 | 2.2 |
| 1.9 | 98.7 | 66.4 | 32.3 | 1.3 |
| 1.1 | 98.8 | 69.7 | 29.1 | 1.2 |
| 0.6 | 100.0 | 74.6 | 25.4 | <0.1 |

[1] Toluene free compositions.

TABLE 9
Caesium exchanged (after calcination) zeolite beta, desorbate composition as a function of product yield

| Yield, percent sieve wt. | Desorbate composition [1] | | | | |
|---|---|---|---|---|---|
| | Percent eb plus p | Percent eb | Percent px | Percent mx | Percent ox |
| 3.1 | 98.3 | 60.9 | 37.4 | 1.2 | 0.5 |
| 1.4 | 99.5 | 67.7 | 31.8 | 0.5 | <0.1 |
| 0.7 | 100.0 | 75.4 | 24.6 | <0.1 | <0.1 |

[1] Toluene free compositions.

TABLE 10
Caesium exchanged (after calcination) zeolite beta, effluent analyses and yield at different conditions

| Adsorb stage: Feed LHSV=0.6, N₂ GHSV=200 | Purge stage: Toluene LHSV=0.6 | Desorption stage: Toluene LHSV=0.6 | Effluent analysis | | | | | | Yield, percent sieve wt. | |
|---|---|---|---|---|---|---|---|---|---|---|
| | | | Adsorb | | Purge | | Desorption | | | |
| | | | Percent toluene | Percent px plus eb [1] | Percent toluene | Percent p plus eb [1] | Percent toluene | Percent p plus eb [1] | Per cycle | Per hour |
| 11 minutes | 3 minutes | 10 minutes | 35.1 | 25.0 | 24.8 | 54.9 | 84.4 | 94.7 | 2.7 | 6.7 |
| Do | 4 minutes | do | 33.2 | 26.6 | 40.3 | 62.7 | 91.1 | 98.6 | 1.8 | 4.3 |

[1] Toluene free compositions.

NOTE.—Temperature 200° C.

TABLE 11
Caesium exchanged (after calcination) zeolite beta, effluent analyses and yield at different conditions

| Adsorb 1 stage | Adsorb 2 stage | Purge stage | Product stage | Effluent analysis | | | | | | Yield, percent sieve wt. | |
|---|---|---|---|---|---|---|---|---|---|---|---|
| | | | | Adsorb | | Purge | | Desorption | | | |
| Feed LHSV=0.33, N₂ GHSV=200 | | Toluene LHSV=0.67 | | Percent toluene | Percent px plus eb [1] | Percent toluene | Percent px plus eb [1] | Percent toluene | Percent px plus eb [1] | Per cycle | Per hour |
| 6 minutes | 7.5 minutes | 4 minutes | 7.5 minutes | 6.14 | 13.5 | 29.1 | 38.7 | 89.3 | 98.1 | 1.7 | 3.9 |
| Do | None | do | do | 52.2 | 19.0 | 65.9 | 56.7 | 93.5 | 98.1 | 0.9 | 3.3 |
| 13.5 minutes | do | do | do | 40.6 | 20.7 | 48.8 | 63.0 | 89.6 | 97.8 | 1.6 | 3.5 |

[1] Toluene free compositions.

NOTE.—Temperature 190° C.

TABLE 12
Caesium exchanged (after calcination) zeolite beta, effluent analysis and yields at different conditions

| Adsorb 1 stage | Adsorb 2 stage | Purge stage | Desorption stage | Effluent analysis | | | | | | Yield, percent sieve wt. | |
|---|---|---|---|---|---|---|---|---|---|---|---|
| | | | | Adsorb | | Purge | | Desorption | | | |
| Feed LHSV=0.67, N₂ GHSV=200 | | Toluene LHSV=0.67 | | Percent toluene | Percent px+eb [1] | Percent toluene | Percent px+eb [1] | Percent toluene | Percent px+eb [1] | Per cycle | Per hour |
| 6 minutes | 5 minutes | 3 minutes | 8 minutes | 54.8 | 13.5 | 13.0 | 41.7 | 82.0 | 93.8 | 2.6 | 7.0 |

[1] Toluene free compositions.

NOTE.—Temperature 200° C.

TABLE 13

Potassium exchanged (after calcination) zeolite beta, effluent analysis and yields at different conditions

| Absorb stage, min./ LHSV plus N₂—100 GHSV | Purge stage, min./LHSV | Desorption stage, min./LHSV | Effluent analysis | | | | | | Yield, percent sieve wt. | |
|---|---|---|---|---|---|---|---|---|---|---|
| | | | Absorb | | Purge | | Desorption | | | |
| | | | Percent toluene | Percent $px$ plus $eb$ [1] | Percent toluene | Percent $px$ plus $eb$ [1] | Percent toluene | Percent $px$ plus $eb$ [1] | Per cycle | Per hour |
| 6/0.92 | 4/0.74 | 8/0.74 | 60.0 | 6.1 | 17.5 | 49.4 | 79.7 | 95.6 | 3.7 | 12.4 |
| 2/2.02 | 4/0.74 | 8/0.74 | 73.4 | 1.8 | 43.3 | 48.8 | 92.4 | 98.1 | 1.4 | 6.0 |
| 3.5/1.43 | 1.6/1.40 | 3/1.40 | 60.6 | 7.0 | 15.1 | 47.0 | 78.0 | 94.6 | 3.8 | 25.1 |

[1] Toluene free compositions.

NOTE.—Temperature 190° C.

TABLE 14

Potassium exchange (after calcination) zeolite beta, benzene desorbent, effluent analysis and yields at different conditions

| Adsorb stage, min./ LHSV plus N₂—100 GHSV | Purge stage, min./LHSV | Desorption stage, min./LHSV | Effluent analysis | | | | | | Yield, percent sieve wt. | |
|---|---|---|---|---|---|---|---|---|---|---|
| | | | Adsorb | | Purge | | Desorption | | | |
| | | | Percent benzene | Percent $px$ plus $eb$ [1] | Percent benzene | Percent $px$ plus $eb$ [1] | Percent benzene | Percent $px$ plus $eb$ [1] | Per cycle | Per hour |
| 5/0.75 | 4/0.63 | 8/0.63 | 68.7 | 1.7 | 22.2 | 43.3 | 86.1 | 96.9 | 2.5 | 9.0 |
| 5/0.75 | 4/0.63 | 8/0.63 | 66.5 | 1.5 | 19.2 | 43.5 | 85.0 | 96.2 | 2.7 | 9.8 |
| 2.5/1.53 | 1/2.26 | 2/2.26 | 62.0 | 3.4 | 18.9 | 49.4 | 85.5 | 95.7 | 2.3 | 25.6 |

[1] Toluene free compositions.

NOTE.—Temperature 195° C.

We claim:

1. A process for the separation of at least one $C_8$ aromatic isomer from a mixture of $C_8$ aromatic isomers which process comprises:
   (a) contacting the feed with a bed of calcined zeolitic alumino-silicate adsorbent having the X-ray diffraction pattern shown in Table 1
   (b) adsorbing the more selectively adsorbable $C_8$ aromatic isomer of the feed in an adsorption stage and withdrawing from the bed of adsorbent a raffinate stream comprising less selectively adsorbed $C_8$ aromatic isomers and
   (c) desorbing the selectively adsorbed $C_8$ aromatic isomer from the adsorbent in a desorption stage.

2. A process as claimed in claim 1 wherein the desorption is effected by displacement with a mononuclear aromatic hydrocarbon or alkane.

3. A process as claimed in claim 1 wherein a purge stage is interposed between the adsorption and desorption stages to remove surface adsorbed and interstitial material.

4. A process as claimed in claim 1 wherein the conditions for the adsorption stage are a space velocity of 0.3 to 4.0 LHSV a pressure from 10 to 100 p.s.i.a., a duration from 0.5 to 10 minutes.

5. A process as claimed in claim 3 wherein the conditions for the purge stage are a space velocity of from 100 to 300 GHSV pressure from 10 to 100 p.s.i.a., duration from 0.5 to 10 minutes.

6. A process as claimed in claim 1 wherein the conditions for the desorption stage are a space velocity of 0.5 to 6.0 LHSV, pressure from 10 to 100 p.s.i.a., duration from 0.5 to 20 minutes.

7. A process as claimed in claim 1 wherein the process is isothermal within the range 120 to 300° C.

8. A process as claimed in claim 1 wherein the zeolite is subjected to ion exchange after calcining with ions selected from lithium, magnesium, calcium, strontium ($Sr^{++}$), barium ($Ba^{++}$) lanthanum ($La^{3+}$) and cerium ($Ce^{3+}$) ions.

9. A process as claimed in claim 1 wherein the zeolite is subjected to ion exchange after calcining with ions selected from potassium and caesium ions.

10. A process as claimed in claim 1 wherein the feed comprises a mixture of p-xylene, ethylbenzene and at least one other $C_8$ aromatic isomer and wherein p-xylene and ethylbenzene are selectively adsorbed.

11. A process as claimed in claim 10 wherein the feed comprises p-xylene, ethylbenzene, o-xylene and m-xylene and in the adsorption stage withdrawing a raffinate stream enriched in o-xylene and m-xylene and in the desorption stage desorbing p-xylene and ethylbenzene from the adsorbent.

12. A process as claimed in claim 11 wherein the feed is a $C_8$ aromatic heart cut obtained from a catalytic reformer.

13. A process as claimed in claim 1 wherein the raffinate withdrawn from the adsorption stage is subjected to isomerization and the isomerized mixture recycled to the adsorption stage.

14. A process as claimed in claim 3 wherein the raffinate withdrawn from the purge stage is recycled to the adsorption stage.

15. A process as claimed in claim 10 wherein the mixture of p-xylene and ethylbenzene recovered in the desorption stage is separated by fractional distillation.

16. A process as claimed in claim 15 wherein the bottoms from the fractional distillation containing p-xylene is subject to fractional crystallization to yield p-xylene.

17. A process as claimed in claim 16 wherein the mother liquor from the fractional crystallization is recycled to the adsorption stage.

References Cited

UNITED STATES PATENTS

| 3,699,182 | 10/1972 | Cattanach | 260—674 |
| 3,308,069 | 3/1967 | Wadlinger et al. | 252—455 |
| 3,133,126 | 5/1964 | Fleck et al. | 260—674 |
| 3,636,121 | 1/1972 | Stine et al. | 260—674 |
| 3,126,425 | 3/1964 | Eberly et al. | 260—674 |

DELBERT E. GANTZ, Primary Examiner

C. F. SPRESSER, Jr., Assistant Examiner

U.S. Cl. X.R.

208—310; 260—668 A, 674 A

PO-1050
(5/69)

UNITED STATES PATENT OFFICE
CERTIFICATE OF CORRECTION

Patent No. 3,793,385                    Dated February 19, 1974

Inventor(s) Adrian Edward Bond, Christopher George Venning Burgess and David Eric Martin It is certified that error appears in the above-identified patent and that said Letters Patent are hereby corrected as shown below:

Column 1, line 49, after "being" insert -- in --;

Column 3, line 39, "ABLE 1." should read -- TABLE 1. --;

Column 3, line 52, "through" should read -- throughout --;

Column 3, line 54, "Absorption" should read -- Adsorption --;

Column 4, line 59, "$C_a$" should read -- $C_8$ --;

Column 8, line 6, "$\underline{px}^1$" should read -- $\underline{px}$ --;

Columns 7 & 8, Table 10, under the heading "Effluent analysis ...Desorption," "Percent $\underline{p}$ plus $\underline{eb}^1$" should read -- Percent $\underline{px}$ plub $\underline{eb}^1$ --;

Columns 7 & 8, Table 11, under the heading "Effluent analysis ...Adsorb...Percent toluene", "40.6" should read -- 40.7 --; and Columns 9 & 10, Table 13, under the heading "Effluent Analysis," "Absorb" should read -- Adsorb --.
Columns 9 and 10, Table 13, in the heading, "Absorb stage, min./" should read -- Adsorb Stage, Min./ --.

Signed and sealed this 3rd day of September 1974.

(SEAL)
Attest:

McCOY M. GIBSON, JR.                    C. MARSHALL DANN
Attesting Officer                       Commissioner of Patents